Nov. 29, 1966 S. DARLINGTON 3,289,116

PRESCRIPTIVE TRANSFORMERLESS NETWORKS

Filed March 21, 1962 5 Sheets-Sheet 1

INVENTOR
S. DARLINGTON
BY G. E. Kersey
ATTORNEY

INVENTOR
S. DARLINGTON
BY G. E. Kersey
ATTORNEY

PRESCRIPTIVE TRANSFORMERLESS NETWORKS

Filed March 21, 1962 5 Sheets-Sheet 3

INVENTOR
S. DARLINGTON
BY G. E. Kerry
ATTORNEY

INVENTOR
S. DARLINGTON
BY G. E. Kersey
ATTORNEY

PRESCRIPTIVE TRANSFORMERLESS NETWORKS

Filed March 21, 1962

INVENTOR
S. DARLINGTON
BY G. E. Kersey
ATTORNEY

United States Patent Office 3,289,116

Patented Nov. 29, 1966

3,289,116

PRESCRIPTIVE TRANSFORMERLESS NETWORKS

Sidney Darlington, Passaic Township, Morris County, N.J., assignor to Bell Telephone Laboratories, Incorporated, New York, N.Y., a corporation of New York Filed Mar. 21, 1962, Ser. No. 181,242
14 Claims. (Cl. 333—70)

This invention relates to transformerless networks, particularly those constituted of resistive and capacitive elements, having prescribed characteristics.

In response to an applied excitation, a network exhibits an external behavior that is attributable to the nature of its internal elements. The relationships among externally applied excitations and their responses are commonly described by driving point and transfer characteristics. When the excitations and responses take place at like pairs of terminals, the relationship is of the driving point variety. But, when the excitations and responses take place at different pairs of terminals, the relationship is of the transfer variety.

For separately prescribed driving point characteristics, or transfer characteristics, the elements required to realize a network with desired behavior can be determined with facility by existing procedures. However, for jointly prescribed driving point and transfer charatceristics, existing procedures are inadequate. Either they lead to extensive networks of undue complexity, or they require transformers, desirably ideal. Needless to say, an ideal transformer is unattainable in practice and, even when closely approximately adds excessive bulk to any network incorporating it.

Accordingly, it is an object of the invention to simplify networks having prescribed driving pont and transfer characterstics. A related object is to realize such networks generally without the need for transformers. A still further object is to realize transformerless networks having prescribed driving point and transfer characteristics attributable solely to resistive and capacitive elements.

To accomplish the foregoing and related objects, the invention provides ladder-like sub-networks for realizing various sets of terms in partial fraction expansions that are expressed as functions of a complex frequency variable and are completely descriptive of the driving point and transfer characteristics of a desired network. Each set of terms corresponding to a single pole in the complex frequency plane can have as many constituent residues as the number of independently prescribed characteristics.

Generally, the various sub-networks, or combinations of them, are bridged by impedance elements which cancel any undesired residues otherwise created. Frequently a bridging element is negative, but it becomes less so, even positive, if the bridge is also used to realize one or more residues of the partial fraction expansions. When required, a bridging element is positioned to accord with negative residue in the set of terms in the partial fraction expansions realizing the corresponding in sub-network. On occasion a sub-network will be unaccompanied by an undesired residue and no bridge is required.

In any event, the series arms of each sub-network contain series-connected elements, some zero, and the shunt arms contain shunt-connected elements, some infinite. For one embodiment of the invention, the elements in the series arms are of one variety, e.g., resistive; those in the shunt arms are of another variety, e.g., capacitive; and the bridging elements, where required, are of either variety, e.g., resistive or capacitive.

Finally, the desired network is formed by connecting the sub-networks in shunt or in series according to whether the transfer and driving point characteristics are expressed as admittances or impedances.

Other attributes of the invention will become apparent after considering several of its illustrative embodiments taken in conjunction with the drawings, in which.

Figure 1:
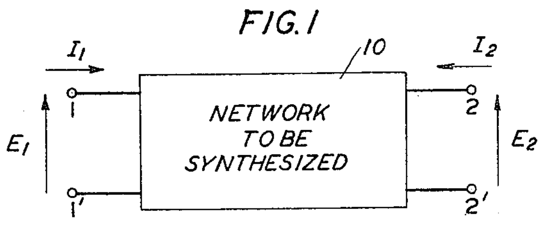
FIG. 1 is a network diagram setting forth the context of the invention.

Consider the context of the invention as set forth by FIG. 1. Interposed between at least two terminal pairs 1–1′ and 2–1′ is a network 10 that is to be realized with prescribed driving point and transfer characteristics. The characteristics, which determine the responses of the network to applied excitations, are of the admittance variety or of the impedance variety.

If the prescribed characteristics are admittance functions, generalized as $Y_{ij}$ with subscripts $i$ and $j$ running over 1 and 2, the relationships among the current $I_1$ and $I_2$ and voltages $E_1$ and $E_2$ at the terminal pairs of the network are expressed by Equation 1:

$$I_1 = Y_{11}E_1 - Y_{12}E_2$$
$$I_2 = -Y_{21}E_1 + Y_{22}E_2 \qquad (1)$$

In Equation 1 the driving point or transfer nature of the admittance $Y_{ij}$ depends upon whether the subscripts are alike or different.

If, in addition, the network is reciprocal, its transfer admittances are equal and its admittance matrix A, corresponding to Equation 1, is given by expression 2:

$$A = \begin{vmatrix} Y_{11} & -Y_{12} \\ -Y_{12} & Y_{22} \end{vmatrix} \qquad (2)$$

Typically, the network 10 of FIG. 1 would be realized for the prescription, in the matrix A of expression (2) of a driving point admittance or a transfer admittance, but not both. The invention, however, permits the network of FIG. 1 to be realized without transformers, for simultaneously prescribed transfer and driving point admittances in the matrix of expression (2).

Once specified, each admittance function, generalized as $Y_{ij}$, can be expressed in the complex frequency plane as a quotient of polynomials in the complex frequency variable $s$ according to Equation 3:

$$Y_{ij} = \frac{N_{ij}(s)}{D_{ij}(s)} \qquad (3)$$

where
$N(s)$ is the numerator polynomial and
$D(s)$ is the denominator polynomial.

There are numerous ways of obtaining the requisite quotient of polynomials from specified admittance functions. Some of these are discussed by E. Guillemin in "Synthesis of Passive Network," John Wiley (1957).

In general, a synthesis that proceeds from quotients of polynomials, of the kind generalized in Equation 3 produces a network containing resistive, capacitive and inductive elements—positive or negative. For convenience assume that the network 10 of FIG. 1 is to contain only resistive and capactitive elements. Then the generalized quotient of polynomials can be stated according to Equation 4:

$$\frac{N_{ij}(s)}{D_{ij}(s)}=\frac{a_{nij}s^n+\cdots a_{oij}}{s^{n-1}+\cdots b_{oij}} \qquad (4)$$

This, in turn, can be expanded into a generalized partial fraction expansion taking the form of Equation 5:

$$Y_{ij}=\sum_{\sigma=1}^{n}\frac{K_{\sigma ij}s}{s+s_\sigma}+K_{0ij}+K_{\infty ij}s \qquad (5)$$

where $K_{\infty ij}$ is the residue of the admittance expression $Y_{ij}$ at a pole at infinite frequency. In addition, the coefficients of the other terms, namely $K_{\sigma ij}$ and $K_{oij}$ and terms similar to them, will also be designated as residues at finite and zero frequencies, respectively, although strictly speaking they are residues at poles of the function $$\frac{Y_{ij}}{s}$$

Certain of the residues may be zero.

It is to be noted, from the permitted variations in the subscripts $i$ and $j$ of Equation 5, that there is a separate partial fraction expansion for each prescribed admittance characteristics. Taken collectively, the several partial fraction expansions present a distinctive set of terms for each pole of the over-all network.

Each set of terms, corresponding to a pole in the expansion of Equation 5 can be represented by a single sub-network. Then, since the terms of Equation 5 are additive, the over-all network is formed by connecting the individual sub-networks in shunt. Often, however, it is advantageous to combine several sub-networks into a composite sub-network. Where the composite sub-networks have three terminals, designated $a$, $b$ and $c$, the desired network of FIG. 1 is formed by connecting the sub-networks 20–1 through **20–*m* into the over-all network 10 of FIG. 2, in which the two terminals pairs 1–1′ and 2–2′ have a common terminal 3. For each sub-network 20, one of its three terminals is common to the common terminal 3 of the over-all network. In general, the common terminal of the sub-network can be any one of its three terminals $a$, $b$ or $c$. Hence, each sub-network has an inherent three-way symmetry. This symmetry is preserved if the admittance matrix of the sub-network 20** takes the "indefinite" form given in expression (6), rather than the definite form given in expression (2):

$$A'=\begin{vmatrix} Y_{aa} & -Y_{ab} & -Y_{ac} \\ -Y_{ab} & Y_{bb} & -Y_{bc} \\ -Y_{cc} & -Y_{bc} & Y_{cc} \end{vmatrix} \qquad (6)$$

where the symbol A′ designates the indefinite matrix.

The indefinite matrix A′ relates the currents into all three of the sub-network terminals $a$, $b$ and $c$ to their appropriate voltages. It is to be noted that a definite matrix can be obtained for input and output terminals sharing the terminal $j$ simply by removing the $j$th row and column. Thus, where $j=c$, a removal of the 3rd row and 3rd column yields directly a definite matrix comparable to that of expression (2). Further, an indefinite matrix is so constructed that a diagonal admittance is given by summing the off-diagonal admittances in its row—as stated in expression (7):

$$\begin{aligned} Y_{aa}&=Y_{ab}+Y_{ac} \\ Y_{bb}&=Y_{ab}+Y_{bc} \\ Y_{cc}&=Y_{ac}+Y_{bc} \end{aligned} \qquad (7)$$

It follows from expression (7) that a sub-network can be completely defined by the off-diagonal admittances in an indefinite matrix. Also, if the admittances are specified by a definite matrix, the admittances of the counterpart indefinite matrix are obtained from expression (7).

Figure 2:
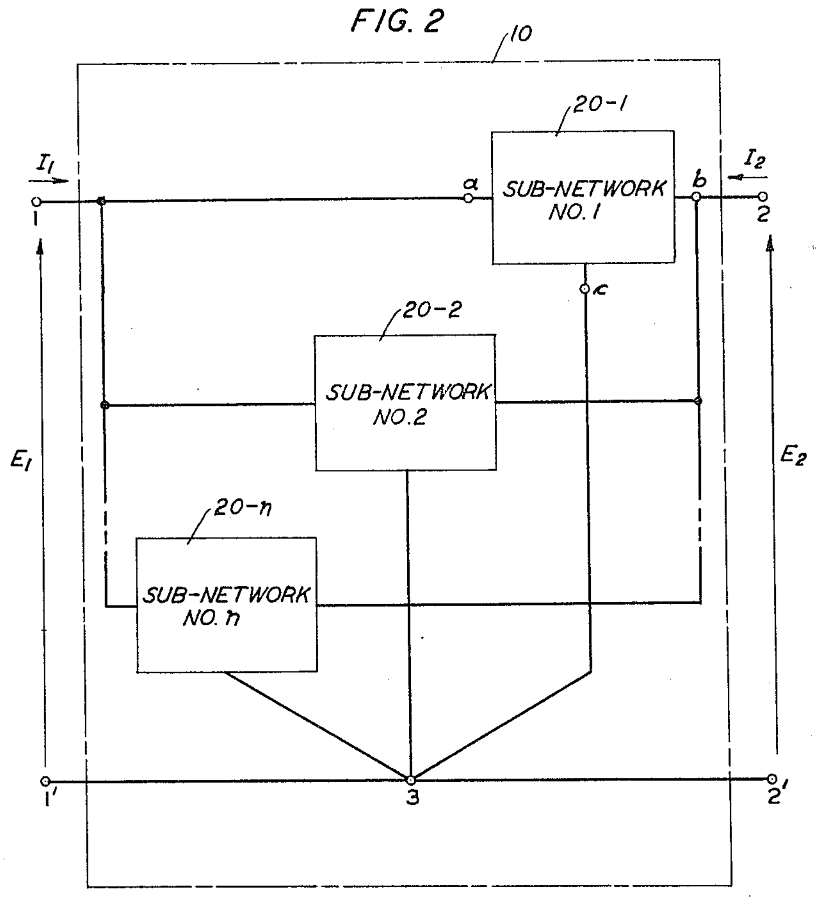
FIG. 2 is a block diagram of sub-networks constituting the network of FIG. 1.

The sub-network 20 in FIG. 2, corresponding to one or more sets of terms generalized in Equation 5, can be realized in any order. For convenience a sub-network 20–1, corresponding to behavior at zero and infinite freqeuncies, is realized first. The residues $K_{\infty ij}$ and $K_{\sigma ij}$ in Equation (5) respectively determine the zero and infinite frequency admittances. Changes in these residues do not change the finite poles in Equation 5 or their corresponding residues, but they do change the admittances at all frequencies, except those of the finite poles.

Figure 3:
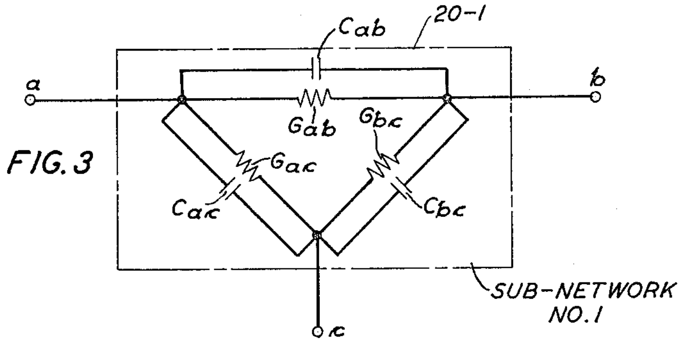
FIG. 3 is a schematic diagram of an R-C (resistance-capacitance) sub-network displaying prescribed behavior at zero and infinite frequencies.

A ladder sub-network 20–1 displaying appropriate behavior at zero and infinite frequencies is shown in FIG. 3. Where the conditions of Equation 8 are met, the sub-network 20–1 has conductive-capactitive branches taking the form of a "pi."

$$\begin{aligned} G_{ij}&=K_{0ij}>0 \\ C_{ij}&=K_{\infty ij}>0 \end{aligned} \qquad (8)$$

$i, j=a, b, c$ and $i\neq j$
$G$=Conductive magnitude of resistive component
$C$=Capacitive magnitude of capacitive component Of course, a particular residue may be zero, in which case the corresponding arm will be absent from the sub-network 20–1 in FIG. 3.

Realization of the sub-networks 20–2 through **29–*m***, corresponding to finite poles $s_\sigma$, will depend upon the rank of a matrix of residues at those poles. Such a residue matrix takes the form of the indefinite matrix in expression 6. First, consider a residue matrix of rank 1 for which the largest square array in the matrix with a non-vanishing determinant contains a single term. Then, the off-diagonal residues are related according to Equation 9:

$$K_{\sigma ab}K_{\sigma ac}+K_{\sigma ab}K_{\sigma bc}+K_{\sigma ac}K_{\sigma bc}=0 \qquad (9)$$

Figure 4:
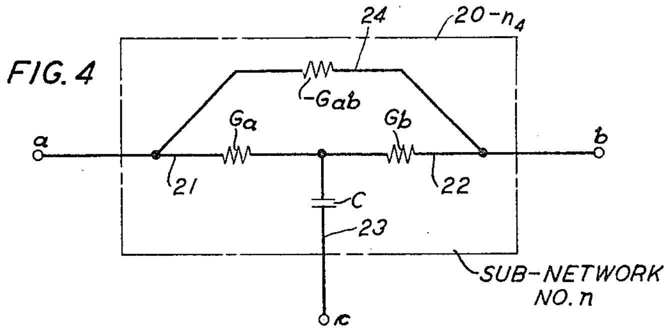
FIG. 4 is a schematic diagram of an R-C sub-network displaying prescribed, finite frequency behavior.

Under this circumstance, each set of partial fraction terms corresponding to a finite pole can be realized by a ladder sub-network **20–*n*₄ of the kind shown in FIG. 4, taking the form of a "T," in which the series arms 21 and 22 are resistors and the shunt arm 23 is a capacitor. In addition, there is a negative resistor 24 bridging the series arms in order to cancel an undesired effect, corresponding to an additional residue, at zero frequency. Terminal designations are literal, i.e., $a$, $b$ and $c$, respectively, rather than numerical, i.e., 1, 2 and 3, since the association between the two kinds of designations will depend upon the sign of the residue $K_{\sigma ij}$, e.g., under one condition, to be discussed shortly, terminal $a$ will be associated with terminal 1 of the network 10 in FIG. 2, but under another condition terminal $a$ will be associated either with terminal 2 or with terminal 3**.

The admittance expressions for the single pole $s_\sigma$ of the sub-network 20–$n_4$ are given by Equation 10:

$$\begin{aligned} Y_{ab}&=\left(\frac{G_aG_b}{G_a+G_b}\right)\cdot\left(\frac{s}{s+s_\sigma}\right) \\ Y_{ac}&=G_a\cdot\frac{s}{s+s_\sigma} \\ Y_{bc}&=G_b\cdot\frac{s}{s+s_\sigma} \end{aligned} \qquad (10)$$

and the corresponding synthesis conditions on the elements of the sub-network 20–$n_4$ are those of Equation 11:

$$Y_{\sigma ij}=\frac{K_{ij}s}{s+s_\sigma} i,\ j=a,\ b,\ c,\ i\neq j$$

$$G_a=K_{\sigma ac}$$

$$G_b=K_{\sigma bc}$$

$$-G_{ab}=K_{\sigma ab}=\frac{-K_{\sigma ac}\cdot K_{\sigma bc}}{K_{\sigma ac}+K_{\sigma bc}}$$

$$C=\frac{K_{\sigma ab}+K_{\sigma bc}}{s_\sigma} \qquad (11)$$

The conductance $-G_{ab}$ of the negative bridge 24 has the effect of canceling the undesired residue, created at zero frequency, that would otherwise accompany the ladder portion of the sub-network 20–$n$ taken alone. Because of the bridge compensation, a ladder sub-network of the kind shown in FIG. 4 is able to serve as a constituent sub-network corresponding to each finite pole set of terms in the partial fraction expansions of Equation 5, thus allowing an over-all network 10 with prescribed driving point and transfer characteristics to be realized without the use of ideal transformers.

Figure 5:
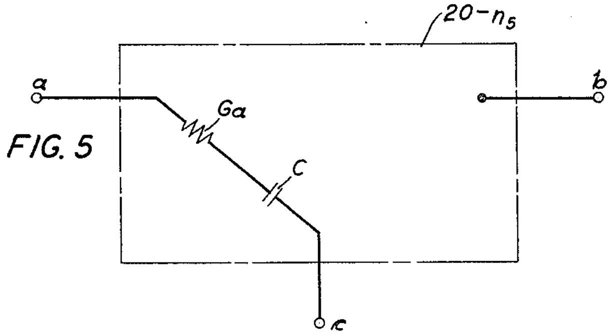
FIG. 5 is a schematic diagram of an R-C sub-network meeting limiting conditions.

If the residues are nonzero, Equation 9 will be satisfied only if one of them is negative. With the negative residue is associated the negative conductance $-G_{ij}$, whose resistor is bridged between the terminals $a$, $b$; $a$, $c$; or $b$, $c$, corresponding to the subscripts of the residue. On the other hand, Equation 9 can also be satisfied if two of the residues are zero and the remaining one is positive. The result is the sub-network 20–$n_5$ of FIG. 5 for which the "T" of FIG. 4 degenerates into a single branch constituted of a resistor of conductance $G_a$ and a capacitor C connected in series between the two terminals corresponding to the seal residue.

Since the zero-frequency set of residues in the partial fraction expansions contributes resistors to its sub-network 20–1 of FIG. 3, it is often possible to adsorb the negative bridge 24 of a sub-network 20–$n_4$ associated with finite poles.

In that event the resistor for a zero-frequency residue is combined with the negative bridge to produce a resistive element which serves simultaneously to cancel the undesired ladder residue and to realize a desired zero-frequency residue.

However, the possibility of having the bridge component absorbed is improved if a second kind of ladder sub-network is available. Such a sub-network 20–$n_6$ takes the form given in FIG. 6, in which the series branches of the "T" contain capacitors, the shunt branch contains a resistor and the bridge is a negative capacitor. Once again the bridging element cancels an undesired residue, but here that cancellation occurs at infinite frequency.

The appropriate synthesis formulas for the sub-network 20–$n_6$ are given by the Equation 12:

$$Y_{\sigma ij}=\frac{K_{\sigma ij}s}{s+s_\sigma} i,\ j=a,\ b,\ c$$

$$C_a=\frac{K_{\sigma ac}}{s_\sigma}$$

$$C_b=\frac{K_{\sigma bc}}{s_\sigma}$$

$$-C_{ab}=\frac{K_{\sigma ab}}{s_\sigma}=\frac{-K_{\sigma ac}K_{\sigma bc}}{(K_{\sigma ac}+K_{\sigma bc})s_\sigma}$$

$$G=K_{\sigma ac}+K_{\sigma bc} \qquad (12)$$

Figure 6:
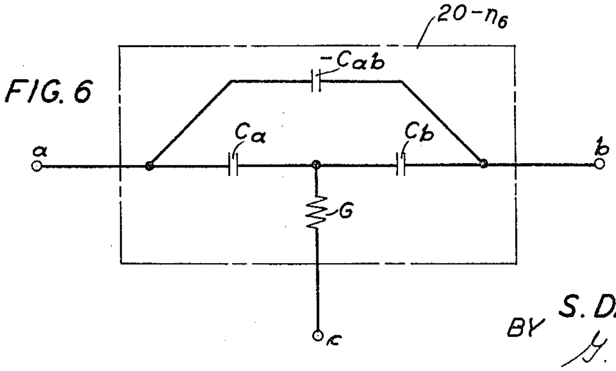
FIG. 6 is a schematic diagram of an R-C sub-network equivalent to that of FIG. 4.

From their external terminals the sub-networks 20–$n_4$ and 20–$n_5$ of FIGS. 4 and 6 are equivalent in the usual network sense. Indeed, their components are positive under exactly the same conditions and they degenerate into the same single branch shown in FIG. 5 under the same conditions. A choice between them will depend upon whether a negative conductance or a negative capacitance is more easily absorbed by the sub-network 20–1 of FIG. 3.

Figure 7:
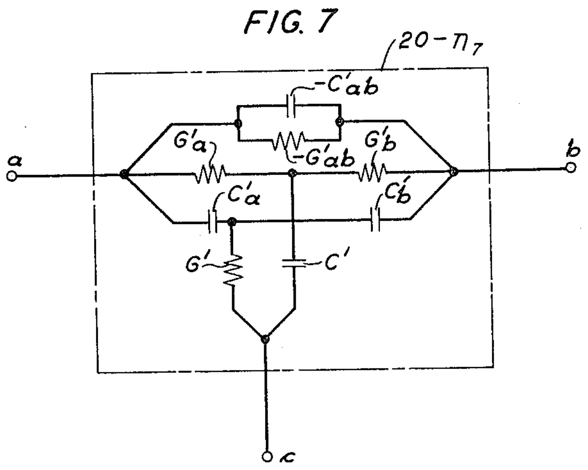
FIG. 7 is a schematic diagram of a combination R-C sub-network.

More generally, two sub-networks, one of the kind shown in FIG. 4 and the other of the kind shown in FIG. 6, may be connected in parallel to realize a single finite admittance. The resultant sub-network 20–$n_7$, illustrated in FIG. 7 has a negative conductance and a negative capacitance associated with it, but each is smaller than it would be in the absence of the other.

The resultant admittance for the sub-network 20–$n_7$ can be expressed according to Equation 13:

$$Y_{\sigma ij}=q\frac{K_{\sigma ij}s}{s+s_\sigma}+(1-q)\frac{K_{\sigma ij}s}{s+s_\sigma} \qquad (13)$$
$$0\leq q<1$$

Then the appropriate formulas for the realization of the components follow Equations 11 and 12 as modified by the factors $q$ and $1-q$, respectively.

Figure 8:
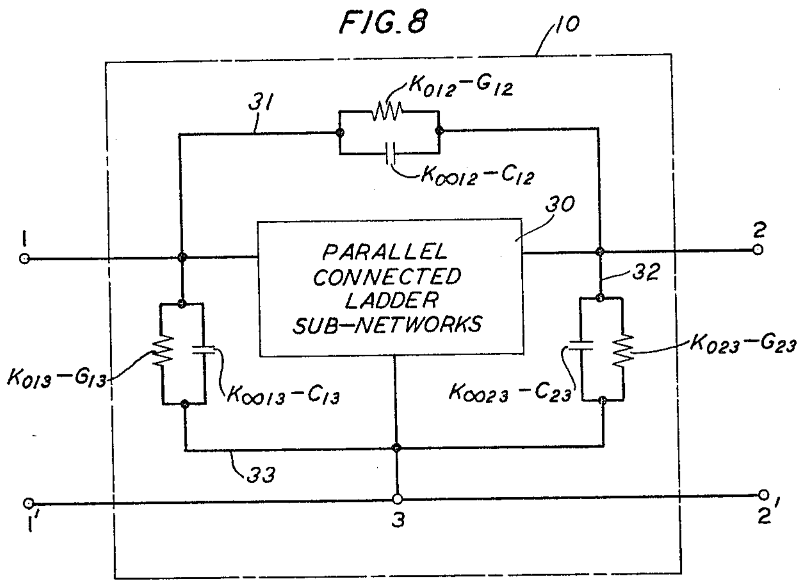
FIG. 8 is a schematic diagram of a prescriptive, transformerless R-C network.

The realization, according to one aspect of the invention, of a complete admittance network 10 from various sub-networks 20 will now be apparent. Corresponding to each nondegenerate finite pole $s_\sigma$ of the admittance $Y_{ij}$, there is a "T" of the kind shown in either FIG. 4 or FIG. 6, or a parallel combination of the two, shown in FIG. 7, accompanied by the appropriate negative components. Corresponding to each degenerate finite pole, there is a single two-terminal branch, shown in FIG. 5. Corresponding to the behavior at zero and infinite frequencies, there is a sub-network of the kind shown in FIG. 3. The complete network 10, as presented in FIG. 8, is realized without transformers and is formed by connecting all these sub-networks in parallel. As a result, a subordinate network 30, constituted of shunt-connected "T's" and degenerative branches, is bridged by several resistive-capacitive branches 31, 32 and 33. The elements $K_{0ij}-G_{ij}$ and $K_{\infty ij}-C_{ij}$ of the bridging branches 31 through 33 are positive when the restrictions of Equation 14 apply:

$$K_{0ij}\geq G_{ij}$$
$$K_{\infty ij}\geq C_{ij} \qquad (14)$$
$$i,j=1,\ 2,\ 3\ k\neq j$$

Otherwise, some or all of the bridging elements are negative. When negative bridging elements are required, they can be provided directly by well known negative impedance devices, or indirectly by negative impedance converters. In the latter case the bridging elements are positive and the negative impedance converters (not shown) are employed at the external terminals of the over-all network 10.

Under certain conditions, groups of the sub-networks, previously presented, can be coalesced into sub-networks which either eliminate the negative admittance bridge element or reduce its required admittance magnitude. When reduced, the negative admittance of a bridge is more easily absorbed by desired residues at zero and infinite frequencies.

Figure 9:
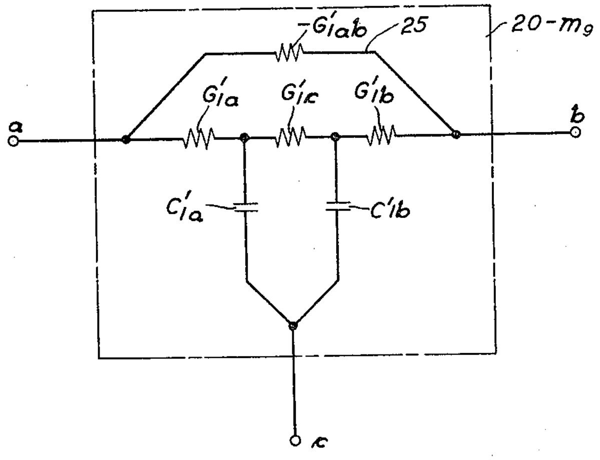
FIG. 9 is a schematic diagram of another sub-network for the network of FIG. 2.

One such sub-network 20–$m_9$ is given by the ladder configuration of FIG. 9, containing three series resistive elements, two shunt capacitive elements and a bridging negative conductance element 25. The sub-network 20–$m_9$ of FIG. 9 is equivalent to the composite 20–$m_{10}$ of the two sub-networks 20–$n_4$ and 20–$n'_4$ shown in FIG. 10 where the $ab$ and $ac$ residues $K_{1ab}$ and $K_{2ac}$ of the respective sub-networks are negative, accounting for the particular orientations of their associated negative bridging elements 24 and 24'. If the pole constant $s_1$ associated with the first sub-network of the composite is smaller than the pole constant $s_2$ associated with the second sub-network, an additional restriction is that the negative quotient of the two $ab$ residues $K_{1ab}$ and $K_{2ab}$ equals the inverse ratio of their corresponding poles. In that event, the transfer admittance $Y_{ab}$ can be represented by Equation 15:

$$Y_{ab}=\frac{h}{(s+s_1)(s+s_2)}-\frac{h}{s_1s_2} \quad (15)$$
$$h=-K_{1ab}s_1(s_2-s_1)=K_{2ab}s_2(s_2-s_1)$$

for which the first term represents the ladder portion of the sub-network 20–$m_9$ in FIG. 9 without the bridging element 25 and the second term gives the negative conductance of the bridging element 25. Thus, the latter component is used to cancel the residue at zero frequency, for the ladder taken alone, that would otherwise exist and prevent realization of the desired transformerless network. It is to be noted that the conductance $G'_{1ab}$ of the bridging element 25 in FIG. 9 is of a lesser magnitude than the conductance $G_{1ab}$ of the correspondingly disposed bridging element 24 in FIG. 10 and that the second bridging element 24', of conductance $G_{2ab}$, is completely eliminated in the composite sub-network of FIG. 9.

Once the magnitude of the bridging element in FIG. 9 has been established in keeping with Equation 15 the other elements of the sub-network are obtained by realizing its ladder portion in a conventional way from its driving point admittance.

Figure 10:
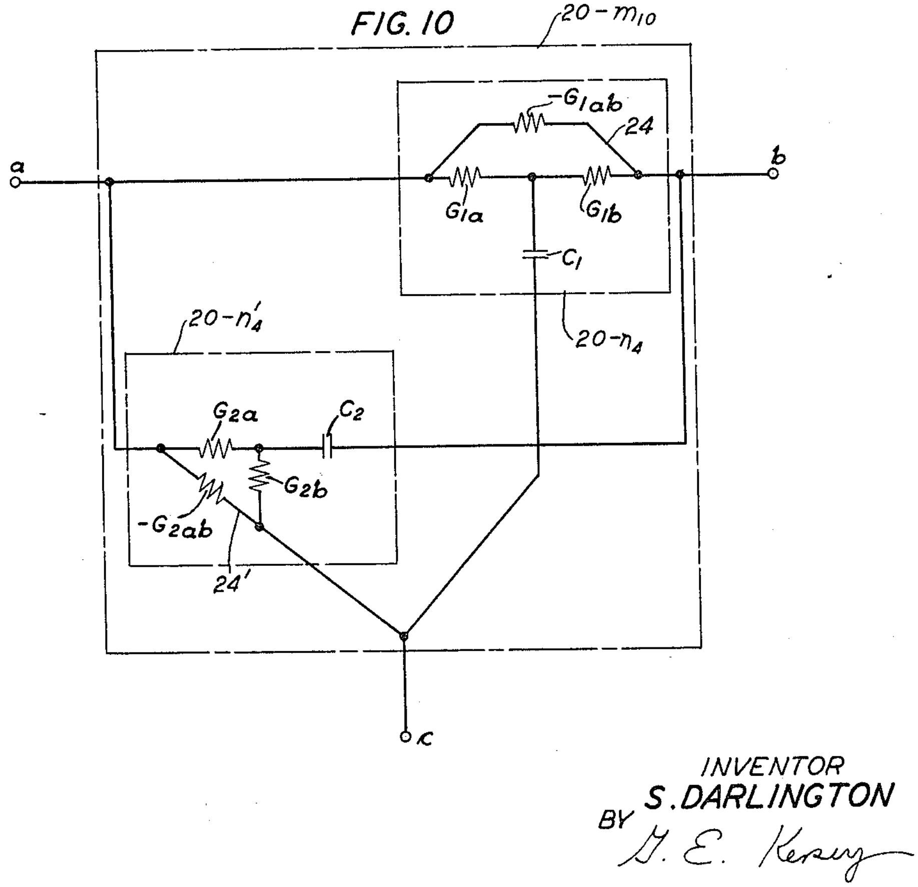
FIG. 10 is a schematic diagram of two shunt connected networks giving rise tot he sub-network of FIG. 9.

On occasion the negative bridge can be eliminated completely. Such is the case where the transfer residues $K_{1ab}$ and $K_{2ab}$ of the sub-networks in FIG. 10 are of equal magnitude and opposite sign. This residue restriction leads to the sub-network 20–$m_{11}$ of FIG. 11 and to the cancellation, without the need for a negative bridge, of the undesired residue-like effect that would otherwise be present. The associated transfer admittance $Y_{ab}$ for the sub-network of FIG. 11 is given by Equation 16:

$$Y_{ab}=\frac{h's}{(s+s_1)(s+s_2)} \quad (16)$$
$$h'=K_{1ab}(s_2-s_1)=-K_{2a}(s_2-s_1)$$

To obtain its ladder elements the sub-network is provisionally realized from its driving point admittance. The result is a capacitor-resistor pair in series with another resistor and another capacitor. Then a transformer is temporarily associated with the resistor of the capacitor-resistor pair and proportioned to give the desired transfer admittance at zero frequency. As a result, the required transfer and driving point admittances are realized at all frequencies. Subsequently, the two capacitors and the transformer are replaced by a "pi" of capacitors, leading to the configuration of FIG. 11.

Figure 11:
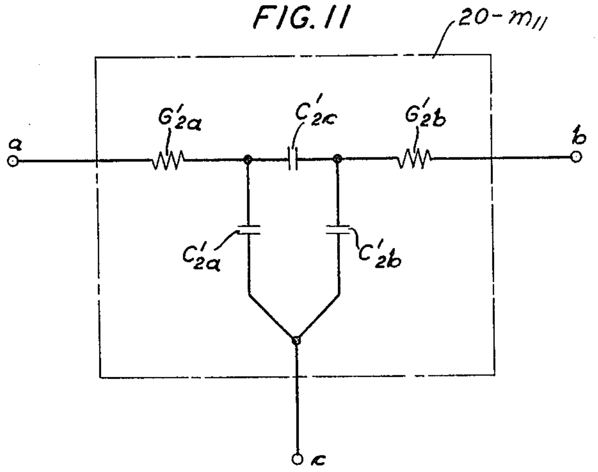
FIG. 11 is a schematic diagram of still another sub-network for the network of FIG. 2.
Figure 12:
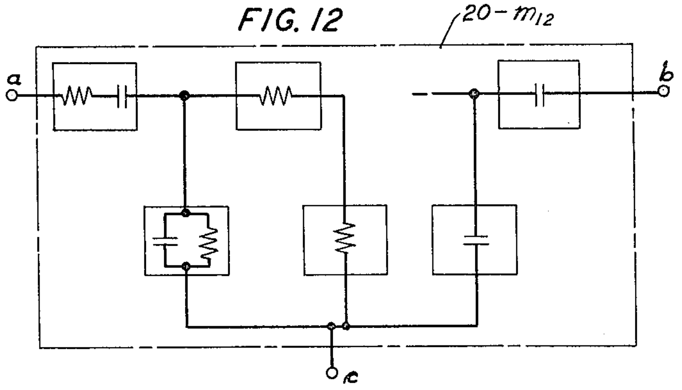
FIG. 12 is a schematic and block diagram of a generalized ladder sub-network.

In general, then, subject to restrictions of the kind discussed in conjunction with the sub-network of FIG. 11, the negative bridge shown in FIGS. 4, 6, 7 and 9 can be eliminated by a ladder sub-network 20–$m_{12}$ of the kind shown in FIG. 12 for which each series branch may be a resistor, a capacitor or a series combination of the two and each shunt branch is a resistor, a capacitor or a parallel combination of the two.

For the generalized ladder sub-network 20–$m_{12}$ of FIG. 12 the transfer admittance $Y_{ab}$ is given by Equation 17:

$$Y_{ab}=\frac{s_\lambda}{a_0+a_1s+\cdots a_\gamma s^\gamma} \quad (17)$$
$$0\leq\lambda\leq\gamma+1, 0\leq\gamma\leq n$$

The terminals $a$, $b$ and $c$ may be connected to the terminals 1, 2 and 3 in FIG. 2 in any order.

Figure 13:
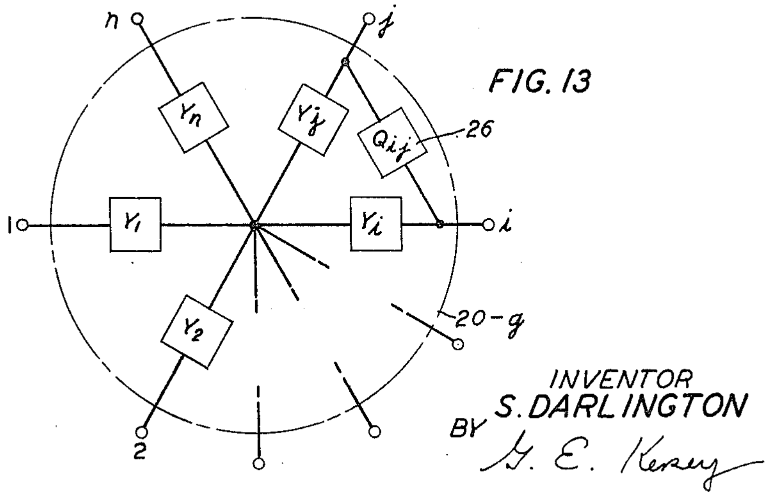
FIG. 13 is a block diagram of a generalized star sub-network.

The synthesis of three-terminal networks in terms of parallel connected sub-networks of the kind presented thus far can also be generalized, as taught by the invention, to a network of $n$ terminals. Prescribed short-circuit admittances $Y_{ij}$ are collected in an indefinite matrix like that of expression (6), except for being of order $n$. After conversion into a partial fraction expansion like that of Equation 5 with $i$ and $j$ running from 1 through $n$, the admittances are realized in the star sub-network configuration 20–$g$ of FIG. 13, which is the generalized ladder-like counterpart of a "T" sub-network.

In the star, each branch may be a resistor, a capacitor, or an open circuit. Then the admittance $Y_i$, given by Equation 18, in branch $i$, from a central node to terminal $i$, is:

$$Y_i=G_i \text{ or } C_is \text{ or } 0 \quad (18)$$

The corresponding transfer admittance is stated in Equation 19:

$$Y_{ij}=\frac{Y_iY_j}{\sum_{k=1}^{n}Y_k}=\frac{Y_iY_j}{\sum G_k+\sum C_ks} \quad (19)$$

Equation 19 is rearranged according to Equation 20:

$$Y_{ij}=\frac{-1}{\sum G_k}\,\frac{Y_i(-s_\sigma)Y_j(-s_\sigma)s}{s+s_\sigma}=Q_{ij} \quad (20)$$
$$s_\sigma=\frac{\sum G_k}{\sum C_k} \text{ and } \frac{Y_i(-s_\sigma)Y_j(-s_\sigma)s}{s+s_\sigma}=\frac{K_{\sigma ij}s}{s+s_\sigma}$$

The added term $Q_{ij}$ in Equation 20 represents an undesired residue that arises when elements $i$ and $j$, in branches $i$ and $j$ are alike. When present, the undesired residue $Q_{ij}$ is removed in the fashion discussed previously for the "T" sub-networks by associating a negative resistance or negative capacitance element 26 with the star, bridged between external terminals $i$ and $j$.

As before, each set of admittance constituents has a single finite pole, and the residue matrix is of rank 1. When the elements in branches $i$ and $j$ are of the same kind, the residue $K_{ij}$ is negative. When the elements are dissimilar, the residue $K_{ij}$ is positive. In addition, there is the previously discussed one-to-one correspondence between a negative residue $K_{ij}$ and the terminal pairs which have negative elements associated with them. And, for each admittance term there are two corresponding stars, one with capacitors and resistors appearing where there are resistors and capacitors in the other. Further, there are varying degrees of degeneracy. While a "T" can degenerate only into a single branch like that of FIG. 4, a star may degenerate into stars with reduced members of branches, "T's," and single branches interconnecting various terminals.

Finally, all star networks corresponding to the various partial fractions are connected in parallel, in a transformerless multi-terminal network.

The foregoing syntheses have assumed that all finite poles have rank 1 residue matrices. However, the invention is also applicable with residue matrices of higher rank where the summation given in Equation 9 is greater than zero. If all three residues are individually greater than zero, as well, the corresponding partial fractions are realized by sub-networks taking the form of FIG. 3, except that each branch is like FIG. 5.

On the other hand, one of the transfer residues may be negative with the others positive and too large to satisfy the rank 1 condition. Nevertheless, a portion of one of the partial fractions with positive residues can be separated and realized as in FIG. 5, so that the reduced residue matrix has rank 1. The same effect applies to star networks with $n$ terminals, except that as many as $n-1$ networks with differing orders of degeneracy will be connected in parallel to realize a single pole with a residue matrix of rank as great as $n-1$.

Another way of realizing an admittance with a high rank residue matrix is by using various ladder sub-networks, of the kind previously discussed, in parallel. Since the parallel combination of two such sub-networks can have a rank 1 residue matrix only if its admittance $Y'_{ij}$ is multiplied by a factor $h$, where $h$ is the same for all $i$ and $j$, higher order realizations are obtained by proportioning $h$ differently for different $i$ and $j$.

By employing well known transformations, for example, by replacing the complex frequency variable $s$ in the driving point and transfer characteristics by $1/s$, or replacing the variable $s$ by $s^2$ and dividing the resulting characteristics by $s$, any of the foregoing realizations involving resistance and capacitance can be used to obtain networks constituted, respectively, of resistance and inductance or inductance and capacitance.

The negative impedance elements required in certain of the above syntheses may be realized by any standard technique. Illustratively, the negative impedance methods employed by J. M. Sipress in U.S. Patent 2,998,580, issued August 29, 1961, or I. W. Sandberg in U.S. Patent 3,046,504, issued July 24, 1962, may be adapted for use with the present invention.

Other adaptations of transformerless techniques for realizing, according to the invention, the constituent ladder sub-networks, of an over-all network having prescribed driving point and transfer characteristics will be apparent to those skilled in the art.

What is claimed is:

1. Apparatus presenting prescribed driving point and transfer admittance characteristics $Y_{ij}=K_{ij}s/(s+s_1)+K\infty$ with respect to those terminals $a$, $b$ and $c=i$, $j$ for $i\neq j$, where K is a residue, $s$ is a complex frequency variable, and $s_1$ is a complex frequency constant, which comprises
a capacitor of capacitance $C_a=K_{ac}/s_1$ connected to a first terminal $a$ of said terminals,
a capacitor of capacitance $C_b=K_{bc}/s_1$ connected to a second terminal $b$ of said terminals,
a resistor of conductance $G=K_{ac}+K_{bc}$ interconnecting the capacitors jointly with a third terminal $c$ of said terminals,
and a capacitor of capacitance $K_\infty+K_{ab}/s_1$, where $K_{ab}$ is a negative quantity, interconnecting said first terminal $a$ with said second terminal $b$.

2. Apparatus presenting prescribed driving point and transfer admittance characteristics $Y_{ij}=K_{ij}s/(s+s_\sigma)$ with respect to three terminals $a$, $b$ and $c=i$, $j$ for $i\neq j$, where K is a residue, $s$ is a complex frequency variable and $s_\sigma$ is a complex frequency constant; which comprises
a resistor of conductance $G_a=K_{ac}$ connected to a first terminal $a$ of said terminals,
a resistor of conductance $G_b=K_{bc}$ connected to a second terminal $b$ of said terminals,
a capacitor of capacitance $C=(K_{ab}+K_{bc})/s_\sigma$ interconnecting the resistors jointly with a third terminal $c$ of said terminals,
and a negative resistor of negative conductance $$-G_{ab}=K_{ab}=K_{bc}\cdot K_{ac}/(K_{ac}+K_{bc})$$

interconnecting said first terminal $a$ with said second terminal $b$.

3. Apparatus comprising
first, second and third terminals,
a first series path interconnecting a first pair of said terminals and containing elements of one kind,
a first shunt path interconnecting said series path with the remaining one of said terminals and containing an element of another kind,
a second series path interconnecting a second pair of said terminals and containing elements of said other kind,
a second shunt path interconnecting said second series path with the terminal excluded from said second pair of terminals and containing an element of said one kind,
a first bridging path interconnecting said first pair of terminals and containing a negative element of said one kind,
and a second bridging path interconnecting said second pair of terminals and containing a negative element of said other kind.

4. Apparatus as defined in claim 3 wherein said elements of one kind are resistors and said elements of said other kind are capacitors.

5. Apparatus presenting prescribed driving point and transfer admittance characteristics $Y_{ij}=K_{ij}s/(s+s_\sigma)$ with respect to those terminals $a$, $b$ and $c=i$, $j$ for $i\neq j$, where K is a residue, $s$ is a complex frequency variable, and $s_\sigma$ is a complex frequency constant, which comprises
a capacitor of capacitance $C_a=K_{ac}/s_\sigma$ connected to a first terminal $a$ of said terminals,
a capacitor of capacitance $C_b=K_{bc}/s_\sigma$ connected to a second terminal $b$ of said terminals,
a resistor of conductance $G=K_{ac}+K_{bc}$ interconnecting the capacitors jointly with a third terminal $c$, of said terminals,
and a negative capacitor of capacitance $$-C_{ab}=K_{ab}/s_\sigma=(-K_{ac}\cdot K_{bc})/(K_{ac}+K_{bc})s$$

interconnecting said first terminal $a$ with said second terminal $b$.

6. A network having terminals $a$, $b$, and $c$ and prescribed driving point and transfer admittances expressed in the form of the partial fraction expansions given by $$Y_{ij}=\sum_{\delta=1}^{n}\frac{K_{\delta ij}}{s+s_\delta}+K_{0ij}+K_{\infty ij}s,\ i \text{ and } j=a,\ b,\ c,\ i\neq j,$$

where $Y_{ij}$ is one of said admittances, $n$ is the number of finite poles of each of the $Y_{ij}$, $s$ is a finite complex-frequency variable, $s_\delta$ is a finite complex-frequency constant representing the location of the $\delta$th pole of $Y_{ij}$, $K_{0ij}$ is the residue of $Y_{ij}$ at said $\delta$th pole, $K_{0ij}$ and $K_{\infty ij}$ are the residues of $Y_{ij}$ at zero and infinite frequency respectively, the said $K_{\delta ij}$ satisfying the relation $$K_{\delta ab}K_{\delta ac}+K_{\delta ab}K_{\delta bc}+K_{\delta ac}K_{\delta bc}=0, \delta=1,2,\ \ldots\ n$$

said network comprising
a three-terminal ladder sub-network connected across terminals $a$, $b$, and $c$ and realizing the residues $K\infty_{ij}$
a plurality of three-terminal ladder sub-networks connected in shunt across terminals $a$, $b$, and $c$, each of said ladder sub-networks simultaneously contributing to the realization of that term in each of said expansion which corresponds to a given finite pole and in addition realizing a residue at zero frequency, and a negative conductance bridging each terminal pair of canceling any undesired residue at zero frequency that may have been introduced by said ladder sub-networks.

7. A network as in claim 6 wherein each of said plurality of ladder usb-networks completely realizes the term in each of said expansions corresponding to a given finite pole.

8. A network as in claim 7 wherein each of said plurality of ladder sub-networks comprises series passive elements of a first kind and passive shunt elements of a second kind.

9. A network as in claim 8 wherein said first and second kinds of elements are each chosen from the class of kinds of elements consisting of conductances, capacitances, and inductances and said first and second kinds of elements are not the same.

10. A network as in claim 9 wherein each of said plurality of sub-networks comprises a first conductance $G_a=K_{\delta ac}$ connecting terminal $a$ to a common point, a second conductance $G_b=K_{\delta bc}$ connecting terminal $b$ to said common point, a capacitance $$C=\frac{K_{\delta ac}+K_{\delta bc}}{s_\delta}$$

connecting terminal $c$ to said common point, and wherein each of said plurality of sub-networks contributes an excess residue at zero frequency given by $$\frac{K_{\delta ac}\cdot K_{\delta bc}}{K_{\delta ac}+K_{\delta bc}}$$

11. A network having terminals $a$, $b$, and $c$ and prescribed driving point and transfer admittances expressed in the form of partial fraction expansions given by $$Y_{ij}=\sum_{\delta=1}^{n}\frac{K_{\delta ij}}{s+s_{\delta}}+K_{0ij}+K_{\infty ij}s,\ i \text{ and } j=a,\ b,\ c,\ i\neq j$$

where $Y_{ij}$ is one of said admittances, $n$ is the number of finite poles of each of the $Y_{ij}$, $s$ is a finite complex-frequency variable, $s_{\delta}$ is a finite complex frequency constant representing the location of the δth pole of $Y_{ij}$ $K_{\delta ij}$ is the residue of $Y_{ij}$ at said δth pole $K_{0ij}$ and $K_{\infty ij}$ are the residues of $Y_{ij}$ at zero and infinite frequency respectively, the said $K_{\delta ij}$ satisfying frequency the relation $$K_{\delta ab}K_{\delta ac}+K_{\delta ab}K_{\delta bc}+K_{\delta ac}K_{\delta bc}=0,\ \delta=1,2,\ \ldots\ n$$

said network comprising

- a three-terminal sub-network connected across terminals $a$, $b$, and $c$ and realizing the residues $K_{0ij}$
- a plurality of three-terminal ladder sub-networks each of said sub-networks simultaneously contributing to the realization of the term in each of said expansions which corresponds to a given finite pole and in addition realizing a residue at infinite frequency, and a negative capacitance bridging each terminal pair for canceling any undesired residue at infinite frequency that may have been introduced by said plurality of said ladder sub-networks.

12. A network as in claim 11 wherein each of said plurality of ladder sub-networks completely realizes the term in each of said expansions corresponding to a given finite pole.

13. A network as in claim 12 wherein each of said plurality of ladder sub-networks comprises a first capacitance $$C_a=\frac{K_{\delta ac}}{s_{\delta}}$$

connecting terminal $a$ to a common point, a second capacitance $$C_b=\frac{K_{\delta bc}}{s_{\delta}}$$

connecting terminal $b$ to said common point, and a conductance $G=K_{\delta ac}+K_{\delta bc}$ connecting terminal $c$ to said common point, and wherein each sub-network gives rise to a residue at infinite frequency given by $$\frac{K_{\delta ac}K_{\delta bc}}{(K_{\delta ac}+K_{\delta bc})s_{\delta}}$$

14. A network having terminals $a$, $b$, and $c$ and prescribed driving point and transfer admittances expressed in the form of partial fraction expansions given by $$Y_{ij}=\sum_{\delta=1}^{n}\frac{K_{\delta ij}}{s+s_{\delta}}+K_{0ij}+K_{\infty ij}s,\ i \text{ and } j=a,\ b,\ c,\ i\neq j$$

where $Y_{ij}$ is one of said admittances, $n$ is the number of finite poles of each of the $Y_{ij}$, $s$ is a finite complex-frequency variable, $s_{\delta}$ is a finite complex-frequency constant representing the location of the δth pole of $Y_{ij}$, $K_{\delta ij}$ is the residue $Y_{ij}$ at said δth pole, $K_{0ij}$ and $I_{\infty ij}$ are the residues of $Y_{ij}$ at zero and infinite frequency respectively, the said $K_{\delta ij}$ satisfying the relation $$K_{\delta ab}K_{\delta ac}+K_{\delta ab}K_{\delta bc}+K_{\delta ac}K_{\delta bc}=0,\ \delta=1,2,\ \ldots\ n$$

said network comprising

- a plurality of a first kind of three-terminal ladder sub-networks connected in shunt across terminals $a$, $b$, and $c$, each of said first kind of ladder sub-networks simultaneously contributing to the realization of the term in each of said expansions which corresponds to a given finite pole and in addition realizing a residue at zero frequency, a plurality of a second kind of three-terminal ladder sub-networks connected in shunt across terminals $a$, $b$, and $c$, each of said second kind of ladder sub-networks simultaneously contributing to the realization of the term in each of said expansions which corresponds to a given finite pole and in addition realizing a residue at infinite frequency,
- a negative conductance bridging each terminal pair for canceling any undesired residue at zero frequency that may have been introduced by said first kind of ladder sub-networks,
- a negative capacitance bridging each terminal pair for canceling any undesired residue at infinite frequency that may have been introduced by said second kind of ladder sub-networks.

References Cited by the Examiner

UNITED STATES PATENTS

| | | | |
|---|---|---|---|
| 1,975,709 | 10/1934 | Blumlein | 333—23 |
| 2,067,444 | 1/1937 | Gewirtz | 333—70 |
| 2,173,426 | 9/1939 | Scott | 333—75 |
| 2,549,065 | 4/1951 | Dietzold | 333—80 |
| 2,788,496 | 4/1957 | Linvill | 333—75 |
| 2,852,751 | 9/1958 | Lundry | 333—28 |
| 2,928,001 | 3/1960 | McLean | 333—80 |
| 2,998,580 | 8/1961 | Lepress | 333—80 |
| 3,001,156 | 9/1961 | Kinariwala | 333—80 |
| 3,009,640 | 11/1961 | Honore | 333—80 |
| 3,041,557 | 6/1962 | Sandberg | 333—80 |
| 3,045,194 | 7/1962 | Sandberg | 333—80 |
| 3,046,504 | 7/1962 | Sandberg | 333—80 |
| 3,205,294 | 2/1965 | Maynard | 331—110 |

OTHER REFERENCES

Ozaki: I.R.E. Trans. Circuit Theory, December 1958, pp. 267–75.

Lucal: Synthesis of Three-Terminal R.C. Networks I.R.E. Trans. on Circuit Theory, vol CT–2, pp. 308–316, December 1955.

ELI LIEBERMAN, *Primary Examiner.*

HERMAN K. SAALBACH, *Examiner.*

C. BARAFF, *Assistant Examiner.*